Figure 2:
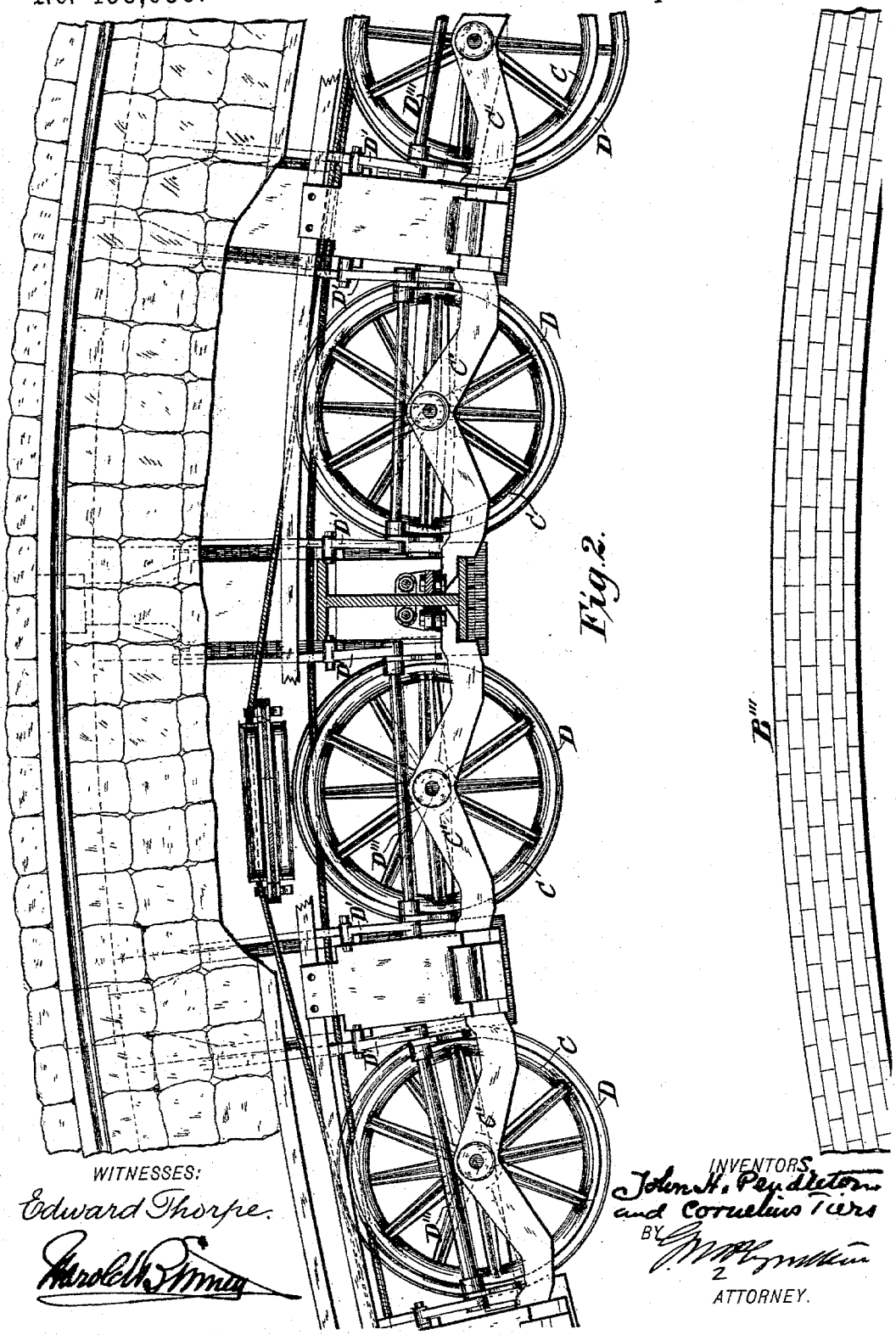

(No Model.) 5 Sheets—Sheet 1.
J. H. PENDLETON & C. TIERS.
CURVE DEVICE FOR CABLE RAILWAYS.
No. 495,056. Patented Apr. 11, 1893.
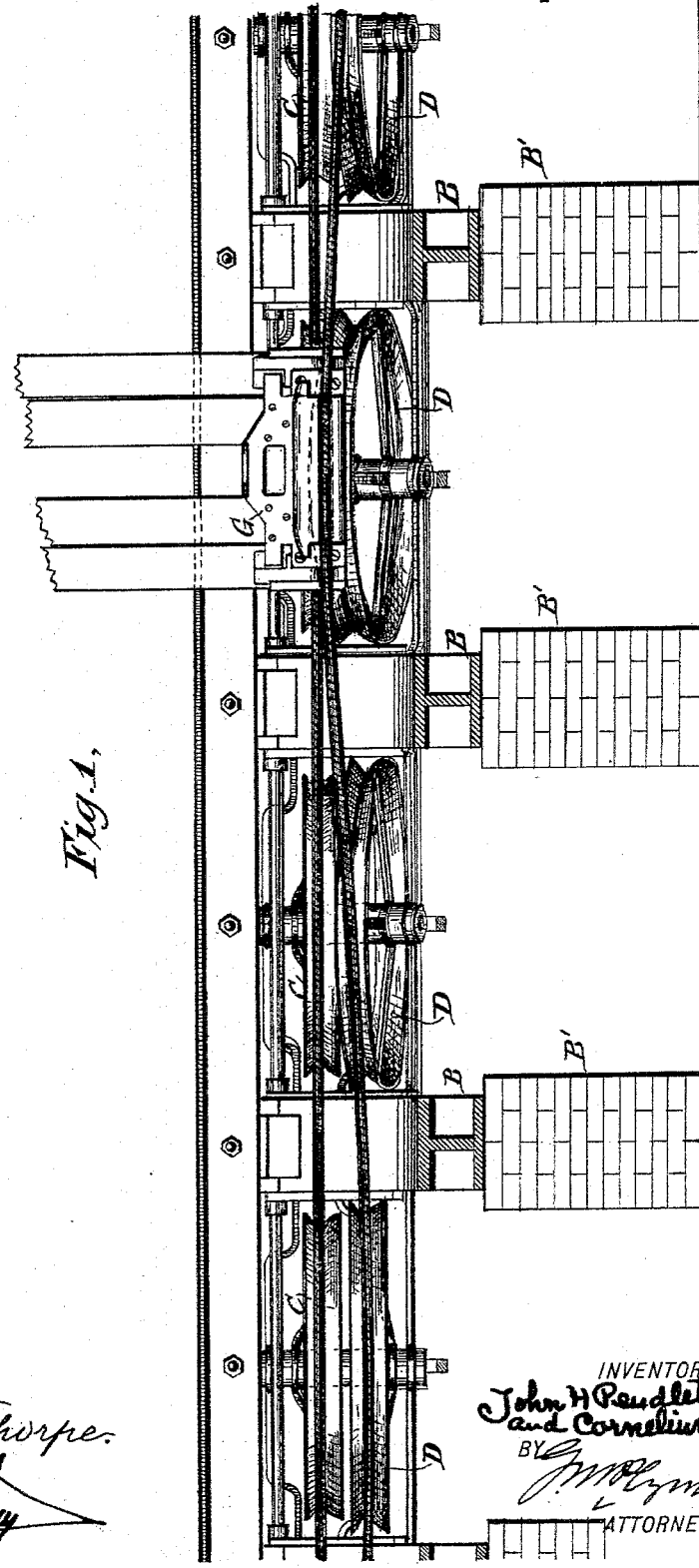
Fig. 1.
WITNESSES:
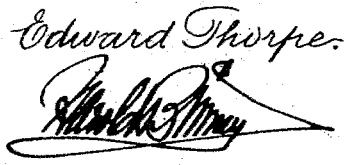
INVENTORS
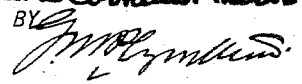
ATTORNEY.

(No Model.) 5 Sheets—Sheet 5.

J. H. PENDLETON & C. TIERS.
CURVE DEVICE FOR CABLE RAILWAYS.

No. 495,056. Patented Apr. 11, 1893.

WITNESSES:
Edward Thorpe

INVENTORS:
John H. Pendleton
and Cornelius Tiers
BY
ATTORNEY.

UNITED STATES PATENT OFFICE.

JOHN H. PENDLETON, OF BROOKLYN, AND CORNELIUS TIERS, OF NEW YORK, N. Y.

CURVE DEVICE FOR CABLE RAILWAYS.

SPECIFICATION forming part of Letters Patent No. 495,056, dated April 11, 1893.

Application filed June 21, 1892. Serial No. 437,511. (No model.)

*To all whom it may concern:*

Be it known that we, JOHN H. PENDLETON, of Brooklyn, and CORNELIUS TIERS, of New York city, New York, have invented certain new and useful Improvements in Curve Devices for Cable Railways, of which the following is a description, reference being taken to the accompanying drawings, which form part of this specification.

Our invention relates particularly to the curve pulleys for supporting the two cables of a double-cable railway as they pass around a curve. With our invention there need be no raising and lowering of the gripper in order to feed the cable back onto the right pulleys, for the lower set of curve pulleys are arranged to move into a position suitable for receiving the cable when the cable has been temporarily removed from the pulleys by a passing gripper. As the cable is paid back onto these pulleys the combined weight and tension, of the cable forces the pulleys back into a position beneath the upper set of curve pulleys. In a patent to John H. Pendleton, No. 436,102, dated September 9, 1890, there is disclosed an arrangement of two stationary horizontal sets of curve pulleys so placed that the gripper may pay the cable back into one or the other set according to the position of the gripper. With this construction, though not absolutely necessary, it is very advisable to raise or lower the gripper to effect the proper relaying of the cable onto the desired curve pulleys. To elevate or depress the gripper and to relieve the lateral tension guide rails were placed above, below, and between the two sets of pulleys. The rail below formed merely a stationary continuation of the grooved faces of the lower pulleys, running continuously around the curve. The upper rail served a similar function and the intermediate rail formed at once a guard, for both sets of pulleys, and a bearing surface for the gripper in passing around the curves. With this construction it is possible to run the gripper at a height which will bring its jaws on a plane somewhat higher than half way between the planes of the two sets of pulleys. When the gripper, in passing with the lower cable in its jaws, draws that cable out of its lower pulleys, the cable inclines upward from the adjacent pulleys to the gripper; and as the gripper passes onward the cable slides upon the intermediate rail back onto supporting pulleys. The action with the upper cable is similar, the incline of the cable being downward. This method of passing curves is not practical because of the excessive wear of the rail upon the cables. The object of this present invention is at once to obviate the necessity of raising or lowering the gripper, and to entirely avoid all such wear. In a patent to the said Pendleton No. 436,104 of September 9, 1890, there is shown and described means for automatically depressing the gripper to cause it to feed the cable properly into the lower pulleys when desired. The need of all such means is done away with by the present invention. In a patent, No. 440,001, dated November 4, 1890, granted to the said Pendleton and others, is disclosed one arrangement by which this may be accomplished. The intermediate rail is omitted and the guide rails above and below normally form the guides or guards for the upper pulleys. When the lower cable is used the pulleys are turned upon an axis parallel with the cable and the exposed face of the lower pulley is brought into position to deliver and receive the cable in the same plane with the gripper jaws, the guard rails then serving as guides for the lower set of pulleys. Our present invention is most nearly related, perhaps, to this last patent, for normally, in this invention also, both sets of pulleys are horizontal and the upper cable may be freely withdrawn and relaid by the passing grippers, which travel in the same plane with the grooves of the upper curve pulleys. When however, a gripper approaches with the lower cable in its jaws it draws the cable outward and upward from the face of the pulleys. As this occurs the pulleys swing forward upon suitable pivots raising the exposed portions of their faces, in approximately the path through which the cable is taken up and replaced, till the forward or exposed portion of the grooves lie in nearly the same horizontal plane with the jaws of the gripper. As the cable is paid back onto the pulleys, each pulley successively is again forced downward and backward by the weight and tension of the cable into its normal or horizontal position. In a prior patent to us and to Andrew Bryson, Jr., No. 436,106, of September 9, 1890, we have disclosed an upper horizontal pulley and a lower inclined pulley for use on curves; the cables lying in the grooves of the pulleys in the same horizontal plane. The cable may be removed and paid back onto lower pulley by the passing gripper, which then travels in the plane of the cables; but, as the lower inclined pulley is stationary, it is necessary when using the other cable with such a construction to elevate the gripper to allow the cable to clear the flange of the incline pulleys; and therefore we extended the upper flange or face of the upper pulley so that the cable could be paid back onto it in the higher plane and then allowed to slip down into the groove. It will be seen that our invention corresponds exactly to the two horizontal sets of pulleys described above, when used with the upper cable, and possesses the many advantages thereof; while when the lower cable is used its lower pulleys successively and temporarily assume the positions and the advantages of the last described inclined pulleys. We refer to these prior patents in order more fully to disclose the systems on which the present invention is an improvement and in order to more clearly distinguish the present invention from what has already been done in this art.

Figure 3:
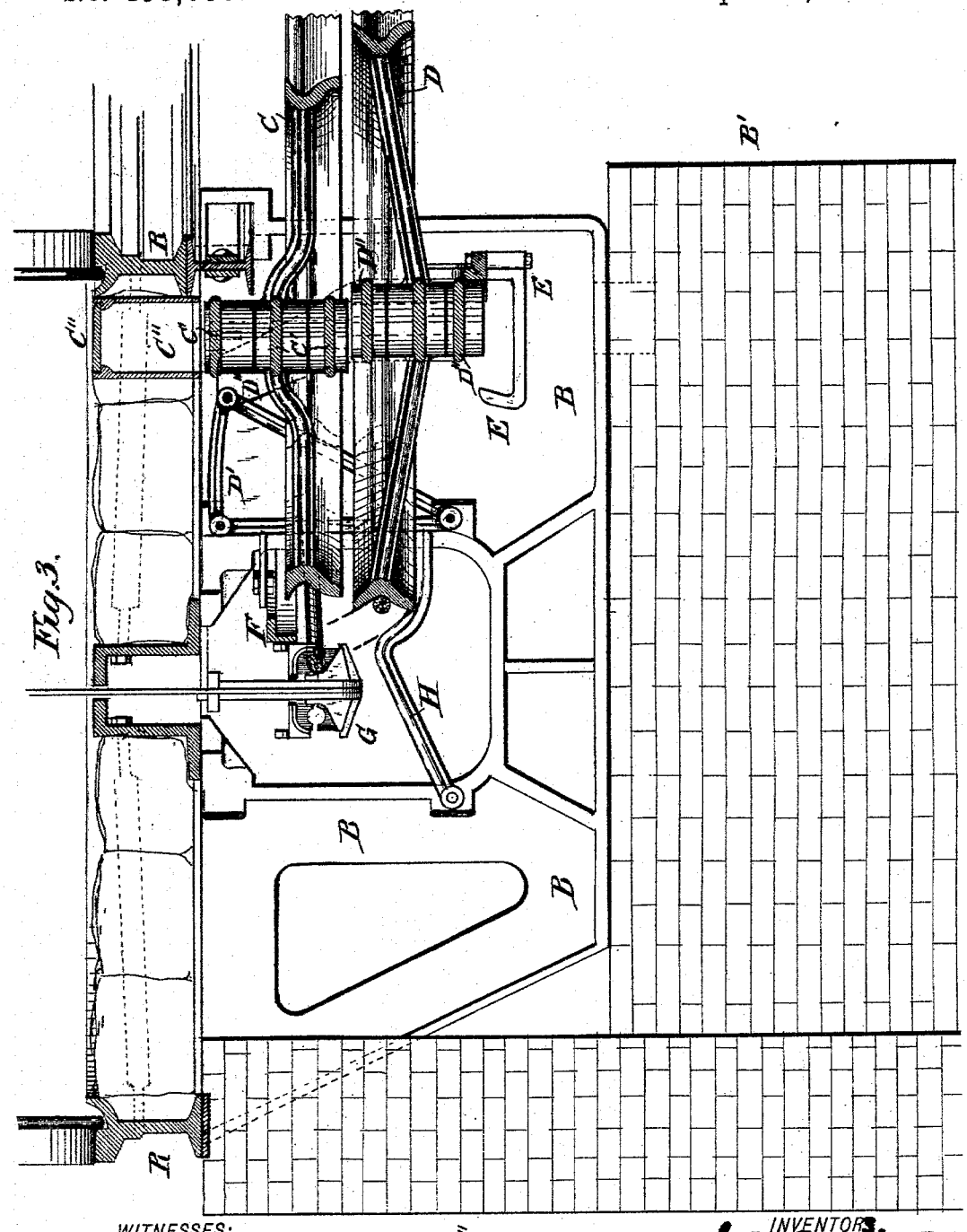
Figure 4:
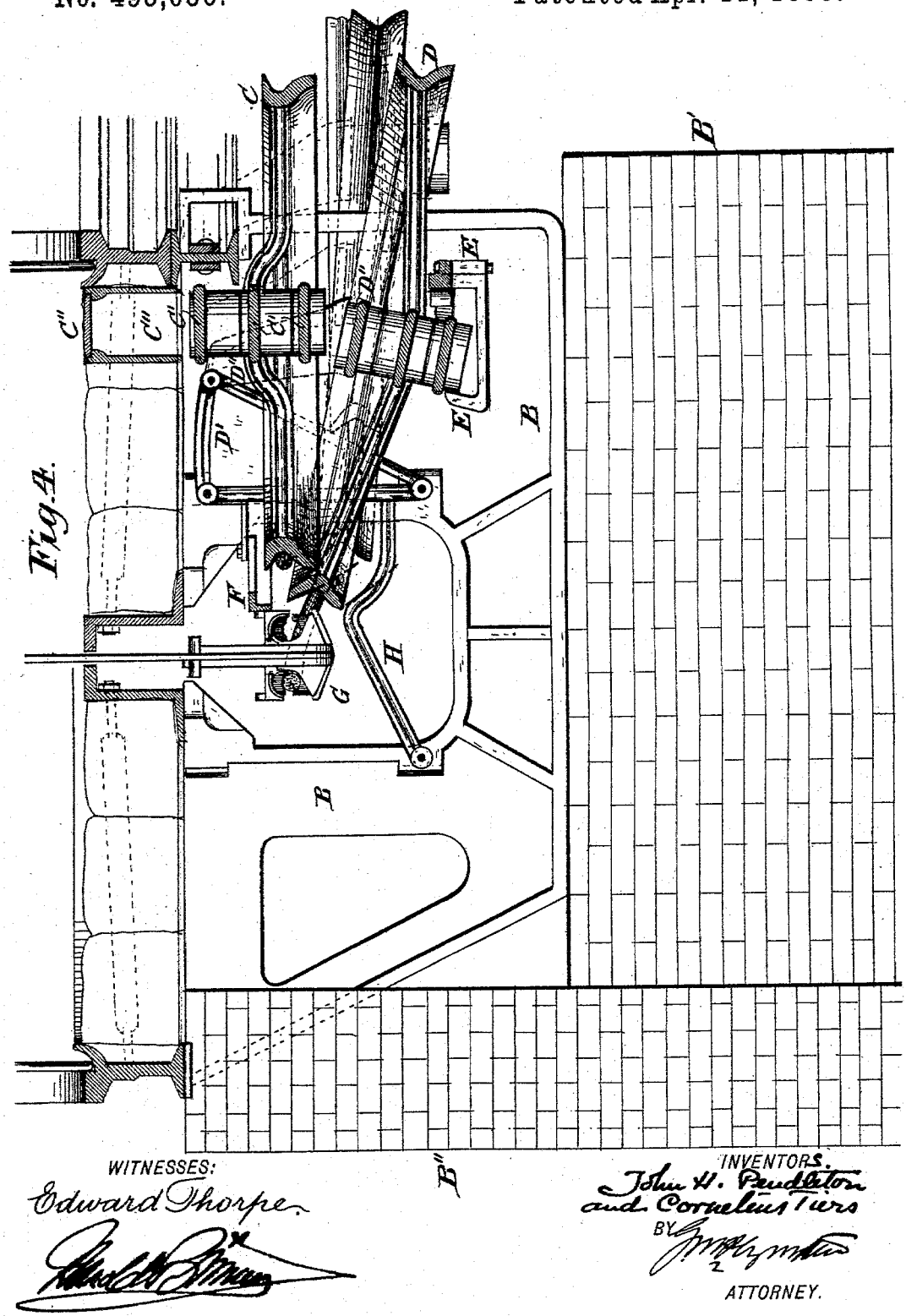
Figure 5:
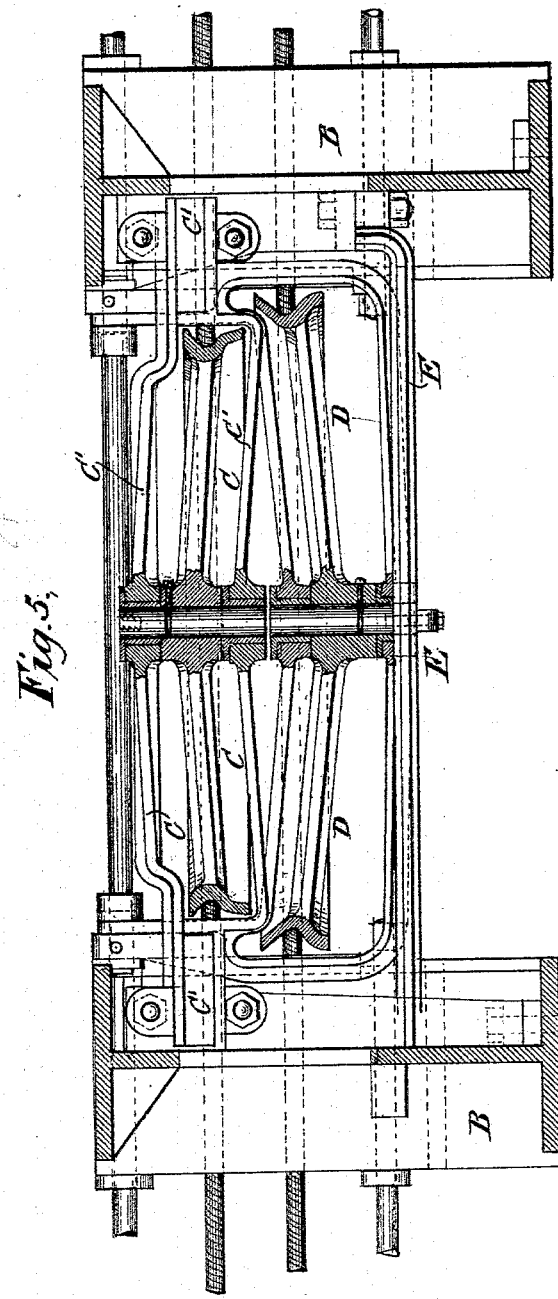

In the accompanying drawings, Figure 1 is an elevation of several curve pulleys as seen from the convex side of the curve; the gripper shown with the lower cable gripped. Fig. 2 is a plan view of the same. Fig. 3 is a sectional view transverse to the trench the gripper being shown with the upper cable gripped therein. Fig. 4 is a sectional view transverse to the trench, the gripper being shown with the lower cable gripped therein and the lower pulley being tilted forward. Fig. 5 is a view partly in section, of a pair of pulleys as seen from the rear looking toward the cables. The cables are shown in their normal position, undisturbed by a passing gripper.

In the figures like letters of reference indicate like parts.

It must not be understood from the following description that gravity must be used to tilt the pulleys. However, we much prefer gravity, to springs or other means. The trench yokes B are mounted on short foundation pillars B' of masonry or brickwork, and are inclosed on the outside of the curve by the wall B'' which rises beneath the stringers or rails R, and on the inner side by a wall B''' (Fig. 2) leaving a passage way, as in Patent No. 436,106, referred to above. We do not claim the detail of this passage way in the present case, because it is fully described and claimed in the aforesaid patent.

Our upper or stationary pulleys C are supported in stationary frames C', bolted to the yokes B, as clearly seen in Figs. 2 and 5. The axis of each of these pulleys turns with the pulley and runs in thimble-shaped bushings on the supporting frame C'. These details are those substantially set forth in patent No. 436,102, aforesaid. To mount or remove the pulley C, it is only necessary to loosen the shaft or axis and to draw it upward by means of a suitable tap hole in the end of the shaft through a hand hole C'' (Fig. 4) in the road bed. The pulley may then be drawn back into the passage way and readily taken out. To mount the pulley the operation is reversed. When no suitable hand holes are provided the frame C' may be unbolted and removed with the pulley in it. For the lower pulley D of each pair we provide stationary brackets D' bolted to the yokes at each side, and a tilting supporting frame D'' which turns upon a shaft D''' carried by the brackets. The pulley D, which we will term the tilting pulley, to distinguish it from the upper stationary pulleys, is mounted in its frame, D' in a manner similar to the pulley C. Stationary stops E limit the tilting movement in both directions. When the cable is in the lower pulley that pulley is drawn against one of the stops and assumes a position directly beneath and parallel with the stationary pulleys. But when the cable is withdrawn from the pulley by the gripper of a passing car, the weight of the pulley and its tilting frame causes it to tilt forward into the position shown in Fig. 4, till it rests against the other stop E. The portion of the pulley face which projects toward the gripper and on which the cable normally rests, (which for convenience we will term the exposed portion of the pulley) travels in the path indicated by the dotted lines. This is nearly the path followed by the cable as it is removed or replaced by the moving gripper. When the gripper is opposite one of the lower pulleys and the pulley is tilted forward as in Fig. 4, the cable, which will be in the more remote jaws of the gripper, will incline downward at each end of the gripper onto the adjacent curve pulleys, the ones immediately adjacent being partially tilted as shown in Figs. 1, 2, and 4. As the gripper passes on, the cable will be paid back directly into the grooves of its pulleys, and will press against the face of its pulleys and force them downward and backward into their horizontal positions. To relieve the lateral tension on the gripper, we provide a guide rail F against which the side of the gripper bears, as shown in the figures. This rail is set forth in patents Nos. 436,106 and 440,001, above referred to. We also provide guard bars H cast with the brackets D' and bolted to the yokes B at each side of each pair of pulleys. These are so formed that for every position of the tilting pulleys, the cable, if dropped onto the guard bars H, will be drawn by the tension back into the grooves of the pulleys. These guard bars being substantial equivalents of the guard or guide rails described and shown in several of the aforesaid patents are not herein made the subject of separate claims, except in so far as they form novel combination with the other parts of our invention.

Besides the obvious advantages of our invention it should be noted that if, for any reason the tilting pulleys should fail to be drawn back by the lower cables, the operation of the upper cable will in no wise be interfered with, and, on the other hand, the slacking or removal of the upper cable will in no wise effect the operation of the lower cable. It is therefore possible to remove either pulley of any pair of pulleys without disturbing the operation of the other.

Having now set forth the operation and construction of one embodiment of our invention and desiring to secure by these Letters Patent the many immaterial changes which may be made in our invention without departing from its principles, we claim the following.

1. In combination for the purposes described, a horizontal curve pulley having a stationary axis, for one cable of a double-cable railway, and a pulley mounted in a tilting frame, for the other cable of the said railway, substantially as set forth.

2. In combination for the purposes described, a pulley C having a stationary axis, a tilting pulley D, and one or more stops to limit the movement of the said tilting pulley, substantially as set forth.

3. In combination for the purposes described, a pulley having a stationary axis, a tilting pulley D, one or more stops to limit the movement of the said tilting pulley, and guards for guiding a cable into the said tilting pulley, substantially as set forth.

4. In combination for the purposes described, a tilting frame, a grooved pulley mounted therein, one or more stops to limit the movement of the said frame, and guard bars H for the said pulley, substantially as set forth.

5. A cable supporting pulley D mounted in a movable frame, the path of motion being such that the pulley follows approximately the combined vertical and lateral movement of the cable, whereby the cable remains longer upon the said pulley and the pressure of the cable is approximately in the line of travel, substantially as, and for the purposes, set forth.

6. In combination with a curve pulley mounted in a movable frame one or more guards therefor formed and placed to guide a cable into the said pulley at all positions of the pulley, substantially as, and for the purposes, set forth.

In testimony whereof we have hereto set our hands this 16th day of June, 1892.

JOHN H. PENDLETON.
CORNELIUS TIERS.

Witnesses:
CHAS. V. MOORE,
WALT. E. PERKINS.